US010053373B2

(12) United States Patent
Govindan et al.

(10) Patent No.: US 10,053,373 B2
(45) Date of Patent: Aug. 21, 2018

(54) MULTI-STAGE BUBBLE COLUMN HUMIDIFICATION AND DEHUMIDIFICATION

(71) Applicants: Massachusetts Institute of Technology, Cambridge, MA (US); King Fahd University of Petroleum & Minerals, Dhahran (SA)

(72) Inventors: Prakash Narayan Govindan, Melrose, MA (US); Mostafa H. Elsharqawy, Dhahran (SA); Steven Lam, Boston, MA (US); Maximus G. St. John, Cambridge, MA (US); John H. Lienhard, Lexington, MA (US)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 29 days.

(21) Appl. No.: 14/806,357

(22) Filed: Jul. 22, 2015

(65) Prior Publication Data

US 2015/0321118 A1 Nov. 12, 2015

Related U.S. Application Data

(62) Division of application No. 13/916,038, filed on Jun. 12, 2013, now Pat. No. 9,120,033.

(51) Int. Cl.
*C02F 1/04* (2006.01)
*B01D 3/14* (2006.01)
(Continued)

(52) U.S. Cl.
CPC ............... *C02F 1/048* (2013.01); *B01D 1/14* (2013.01); *B01D 3/065* (2013.01); *B01D 3/146* (2013.01);
(Continued)

(58) Field of Classification Search
CPC .......... B01D 1/14; B01D 3/065; B01D 3/146; B01D 3/32; B01D 19/0015; C02F 1/048; C02F 1/06; C02F 2103/08; C02F 2103/10
USPC .......................... 261/30, 113, 128, 148, 149
See application file for complete search history.

(56) References Cited

U.S. PATENT DOCUMENTS 2,560,073 A 7/1951 Bloomer
2,560,978 A 7/1951 Persson et al.
(Continued)

FOREIGN PATENT DOCUMENTS

DE 10 70 594 B 12/2012
GB 698 966 A 10/1953
WO 2011/137149 A1 11/2011

OTHER PUBLICATIONS

European Patent Office, International Search Report and Written Opinion for PCT/US2014/041226 (related PCT application) (dated Oct. 6, 2014).

*Primary Examiner* — Charles Bushey
(74) *Attorney, Agent, or Firm* — Modern Times Legal; Robert J. Sayre (57) ABSTRACT

A feed liquid flows into a second-stage humidifier chamber to form a second-stage humidifier bath. A first remnant of the feed liquid from the second-stage humidifier chamber then flows into a first-stage humidifier chamber to form a first-stage humidifier bath having a temperature lower than that of the second-stage bath. A second remnant of the feed liquid is then removed from the first-stage humidifier. Meanwhile, a carrier gas is injected into and bubbled through the first-stage humidifier bath, collecting a vaporizable component in vapor form from the first remnant of the feed liquid to partially humidify the carrier gas. The partially humidified carrier gas is then bubbled through the second-stage humidifier bath, where the carrier gas collects more of the vaporizable component in vapor form from the feed liquid to
(Continued)

further humidify the carrier gas before the humidified carrier gas is removed from the second-stage humidifier chamber.

12 Claims, 4 Drawing Sheets

(51) Int. Cl.
    *B01D 3/06*     (2006.01)
    *B01D 3/32*     (2006.01)
    *C02F 1/06*     (2006.01)
    *B01D 1/14*     (2006.01)
    *B01D 19/00*     (2006.01)
    *C02F 103/08*     (2006.01)
    *C02F 103/10*     (2006.01)

(52) U.S. Cl.
    CPC ........... *B01D 3/32* (2013.01); *B01D 19/0015* (2013.01); *C02F 1/06* (2013.01); *C02F 2103/08* (2013.01); *C02F 2103/10* (2013.01)

(56) References Cited

U.S. PATENT DOCUMENTS

| | | |
|---|---|---|
| 3,653,186 A | 4/1972 | McLendon |
| 4,252,546 A | 2/1981 | Krugmann |
| 4,762,593 A | 8/1988 | Yongner |
| 4,820,456 A | 4/1989 | Kiselev |
| 5,290,403 A | 3/1994 | Saeask |
| 5,939,031 A | 8/1999 | Ellis et al. |
| 6,919,000 B2 | 7/2005 | Klausner et al. |
| 8,444,829 B2 | 5/2013 | Godshall et al. |
| 8,496,234 B1* | 7/2013 | Govindan ............ B01D 1/0058 261/117 |
| 8,523,985 B2* | 9/2013 | Govindan ............ B01D 5/0027 95/211 |
| 8,778,065 B2* | 7/2014 | Govindan ............ B01D 5/0027 96/211 |
| 9,072,984 B2* | 7/2015 | Govindan ............ B01D 5/0027 |
| 9,120,033 B2* | 9/2015 | Govindan ................ B01D 1/14 |
| 9,320,984 B2* | 4/2016 | Govindan ............ B01D 5/0027 |
| 9,643,102 B2* | 5/2017 | Al-Sulaiman ............ B01D 1/14 |
| 9,790,102 B2* | 10/2017 | Govindan ................ B01D 1/14 |
| 2002/0053505 A1 | 5/2002 | Arrison |
| 2010/0314238 A1 | 12/2010 | Frolov et al. |
| 2011/0056822 A1 | 3/2011 | Elsharqawy et al. |
| 2011/0079504 A1 | 4/2011 | Govindan et al. |
| 2013/0074694 A1 | 3/2013 | Govindan et al. |
| 2013/0075940 A1 | 3/2013 | Govindan et al. |
| 2015/0290557 A1* | 10/2015 | Govindan ............ B01D 5/0027 203/21 |
| 2016/0271518 A1* | 9/2016 | Govindan ............ B01D 5/0027 |

\* cited by examiner

MULTI-STAGE BUBBLE COLUMN HUMIDIFICATION AND DEHUMIDIFICATION

RELATED APPLICATION

This application is a Divisional of U.S. application Ser. No. 13/916,038, filed 12 Jun. 2013 (now U.S. Pat. No. 9,120,033 B2, issued 1 Sep. 2015), the entire contents of which are incorporated herein by reference.

BACKGROUND

In this century, the shortage of fresh water will surpass the shortage of energy as a global concern for humanity; and these two challenges are inexorably linked, as explained, for example, in the "Special Report on Water" in the 20 May 2010 issue of *The Economist*. Fresh water is one of the most fundamental needs of humans and other organisms; each human needs to consume a minimum of about two liters per day. The world also faces greater freshwater demands from farming and industrial processes.

The hazards posed by insufficient water supplies are particularly acute. A shortage of fresh water may lead to a variety of crises, including famine, disease, death, forced mass migration, cross-region conflict/war, and collapsed ecosystems. Despite the criticality of the need for fresh water and the profound consequences of shortages, supplies of fresh water are particularly constrained. 97.5% of the water on Earth is salty, and about 70% of the remainder is locked up as ice (mostly in ice caps and glaciers), leaving only a fraction of all water on Earth as available fresh (non-saline) water.

Moreover, the earth's water that is fresh and available is not evenly distributed. For example, heavily populated countries, such as India and China, have many regions that are subject to scarce supplies. Further still, the supply of fresh water is often seasonally inconsistent. Meanwhile, demands for fresh water are tightening across the globe. Reservoirs are drying up; aquifers are falling; rivers are dying; and glaciers and ice caps are retracting. Rising populations increase demand, as do shifts in farming and increased industrialization. Climate change poses even more threats in many regions. Consequently, the number of people facing water shortages is increasing. Naturally occurring fresh water, however, is typically confined to regional drainage basins; and transport of water is expensive and energy-intensive. Nevertheless, many of the existing processes for producing fresh water from seawater (or from brackish water or contaminated waste streams) require massive amounts of energy. Reverse osmosis (RO) is currently the leading desalination technology. In large-scale plants, the specific electricity required can be as low as 4 kWh/m$^3$ at 30% recovery, compared to the theoretical minimum of around 1 kWh/m$^3$; smaller-scale RO systems (e.g., aboard ships) are less efficient.

Other existing seawater desalination systems include thermal-energy-based multi-stage flash (MSF) distillation, and multi-effect distillation (MED), both of which are energy- and capital-intensive processes. In MSF and MED systems, however, the maximum brine temperature and the maximum temperature of the heat input are limited in order to avoid calcium sulfate, magnesium hydroxide and calcium carbonate precipitation, which leads to the formation of soft and hard scale on the heat transfer equipment.

Humidification-dehumidification (HDH) desalination systems include a humidifier and a dehumidifier as their main components and use a carrier gas (e.g., air) to communicate energy between the heat source and the brine. A simple version of this technology includes a humidifier, a dehumidifier, and a heater to heat the seawater stream. In the humidifier, hot seawater comes in direct contact with dry air, and this air becomes heated and humidified. In the dehumidifier, the heated and humidified air is brought into (indirect) contact with cold seawater and gets dehumidified, producing pure water and dehumidified air. As with MSF and MED systems, precipitation of scaling components can occur within the system with consequent damage if the temperature rises too high.

Another approach, described in U.S. Pat. No. 8,119,007 B2 (A. Bajpayee, et al.), uses directional solvent that directionally dissolves water but does not dissolve salt. The directional solvent is heated to dissolve water from a salt solution into the directional solvent. The remaining highly concentrated salt water is removed, and the solution of directional solvent and water is cooled to precipitate substantially pure water out of the solution.

Some of the present inventors were also named as inventors on the following patents that include additional discussion of HDH and other processes for purifying water: U.S. application Ser. No. 12/554,726, filed 4 Sep. 2009 (now U.S. Pat. No. 8,465,006 B2); U.S. application Ser. No. 12/573,221, filed 5 Oct. 2009 (now U.S. Pat. No. 8,252,092 B2); U.S. application Ser. No. 13/028,170, filed 15 Feb. 2011 (now U.S. Pat. No. 8,647,477 B2); and U.S. application Ser. No. 13/241,907, filed 23 Sep. 2011 (now U.S. Pat. No. 9,072,984 B2); and U.S. application Ser. No. 13/550,094, filed 16 Jul. 2012 (now U.S. Pat. No. 8,496,234 B1).

SUMMARY

Methods and apparatus for separating a liquid (e.g., pure water) from a feed liquid (e.g., seawater, brackish water, waste water, or flowback or produced water) in a cost-efficient manner are described herein. Various embodiments of the methods and apparatus may include some or all of the elements, features and steps described below.

In a method for humidification of a vaporizable component from a feed liquid, the feed liquid including the vaporizable component flows into a second-stage humidifier chamber to form a second-stage humidifier bath at a second humidification temperature. A first remnant of the feed liquid from the second-stage humidifier chamber then flows into a first-stage humidifier chamber to form a first-stage humidifier bath at a first humidification temperature, wherein the first humidification temperature is lower than the second humidification temperature. A second remnant of the feed liquid is then removed from the first-stage humidifier chamber.

Meanwhile, a carrier gas is injected into the first-stage humidifier bath in the first-stage chamber and bubbled through the first-stage humidifier bath, where the carrier gas collects the vaporizable component in vapor form from the first remnant of the feed liquid to partially humidify the carrier gas with the vaporizable component. The partially humidified carrier gas is then directed from the first humidifier chamber into the second-stage humidifier bath in the second-stage humidifier chamber and bubbled through the second-stage humidifier bath, where the carrier gas collects more of the vaporizable component in vapor form from the feed liquid to further humidify the carrier gas with the vaporizable component; the humidified carrier gas is then removed from the second-stage humidifier chamber.

In a multi-stage bubble-column humidification apparatus, a feed-liquid source contains a feed liquid; and a second-stage humidifier chamber is configured to receive the feed liquid from the feed-liquid source and contains a bubble distributor. Furthermore, a first-stage humidifier chamber is configured to receive a remnant of the feed liquid from the second-stage humidifier chamber and contains a bubble distributor. A carrier-gas source contains a carrier gas, wherein the first-stage humidifier chamber is configured to receive the carrier gas from the carrier-gas source and to disperse the carrier gas through the bubble distributor of the first-stage humidifier chamber, and wherein the second-stage humidifier chamber is configured to receive the carrier gas from the first-stage humidifier chamber and to disperse the carrier gas through the bubble distributor of the second-stage humidifier chamber.

The multi-stage bubble-column humidifier described herein can substitute for the packed-bed heat exchanger previously used in humidification-dehumidification systems to efficiently humidify dry air. Advantages that may be provided by embodiments of the methods and apparatus described herein include reduced-cost dehumidification, as both the equipment cost and the cost of energy for operation can be reduced. In particular the energy for humidification can be directly provided by the feed liquid in the humidification chambers. Additionally, very high heat and mass transfer rates in the multi-stage humidifier enable the design and use of a very small humidification device. Further still, multi-extraction can be used in the multi-stage bubble column to further increase heat recovery.

Additionally, the methods described herein can be used to advantageously extract water from contaminated waste streams (e.g., from oil and gas production) both to produce fresh water and to concentrate and reduce the volume of the waste streams, thereby reducing pollution and contamination and reducing costs.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Figure 1:
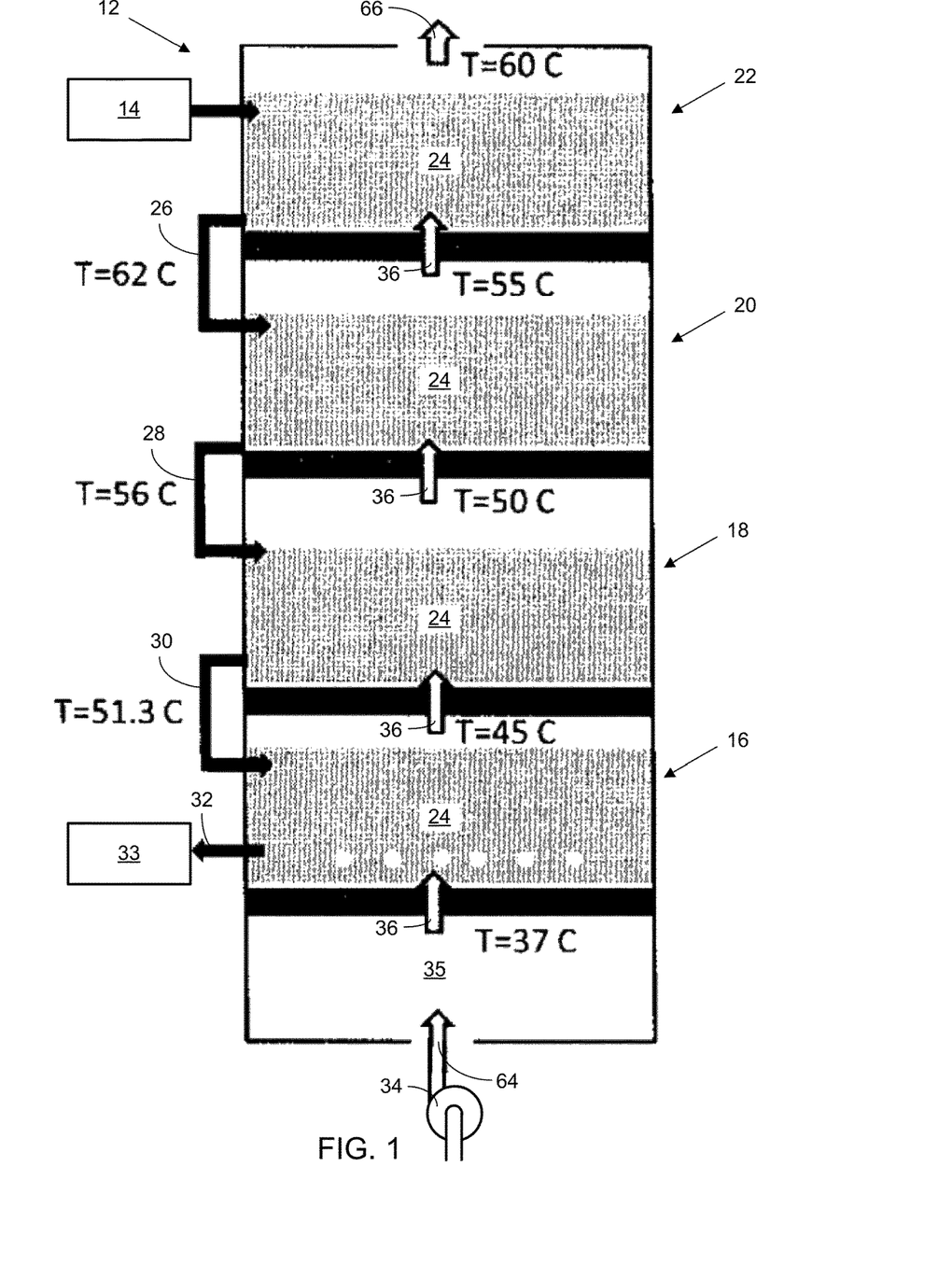
FIG. 1 is a schematic sectional illustration of an embodiment of a multi-stage bubble-column humidifier.

An embodiment of a multi-stage bubble-column humidifier 12 with four stages is illustrated FIG. 1. In other embodiments, more or fewer humidification stages can be linked in series, as described below, for carrying out the humidification process. Feed liquid containing dissolved components is fed from a feed-liquid source 14 (e.g., an ocean, pond or storage tank) into a fourth-stage humidification chamber 22 of the humidifier 12, where the feed liquid forms a bath 24 contained within the chamber 22. In a first embodiment, the feed liquid is fed into the fourth-stage humidification chamber 22 at a temperature of 70° C.

A vaporizable component (e.g., water) of the feed liquid is vaporized into a carrier gas that bubbles through the bath 24, as described below.

A remnant of the feed liquid (with further-concentrated dissolved components) is fed from the fourth-stage humidification chamber 22 via a conduit 26 into a third-stage humidification chamber 20, in which the remnant of the feed liquid forms another bath 24 through which the carrier gas is bubbled. In the first embodiment, the remnant of the feed liquid is fed into the third-stage humidification chamber 20 at a temperature of 62° C. in this embodiment; the temperature of the remaining feed is reduced from stage-to-stage, in part, via the energy used for vaporization of the vaporizable component from the feed liquid at each stage into the carrier gas.

In turn, a remnant of the feed liquid (with still-further-concentrated dissolved components) is fed from the third-stage humidification chamber 20 via a conduit 28 into a second-stage humidification chamber 18, in which the remnant of the feed liquid forms another bath 24 through which the carrier gas is bubbled. The remnant of the feed liquid is fed into the second-stage humidification chamber 18 at a temperature of 56° C. in this embodiment.

Finally, a remnant of the feed liquid (with still-further-concentrated dissolved components) is fed from the second-stage humidification chamber 18 via a conduit 30 into a first-stage humidification chamber 16, in which the remnant of the feed liquid forms another bath 24 through which the carrier gas is bubbled. In the first embodiment, the remnant of the feed liquid is fed into the first-stage humidification chamber 16 at a temperature of 51.3° C. in this embodiment. The remnant of the feed liquid, which can now be in the form of a cold brine, can be removed from the first-stage humidification chamber (e.g., at a temperature of 45.7° C. in this embodiment) via a conduit 32 to a brine storage reservoir 33. Accordingly, the temperature of the feed liquid can drop by, e.g., about 5%-15% across each stage.

Figure 2:
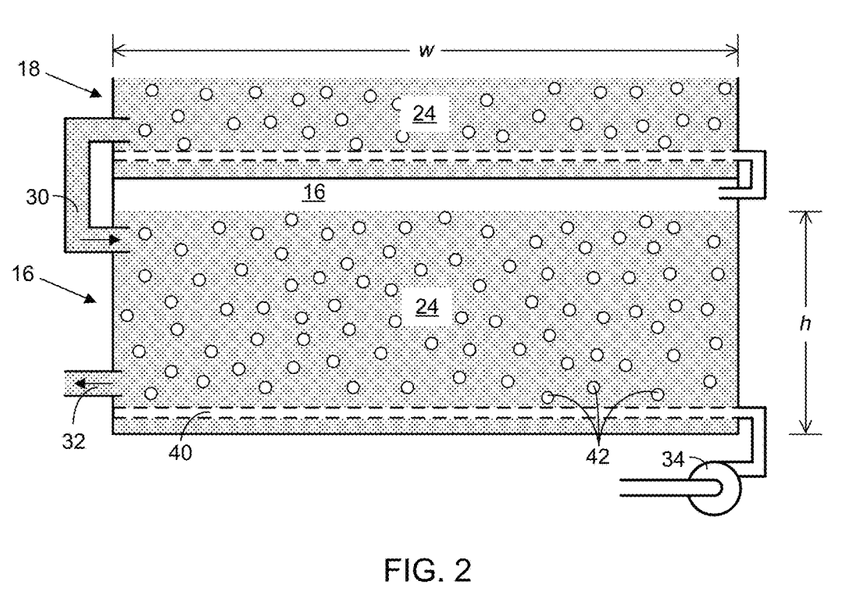
FIG. 2 is a sectional illustration of an embodiment of a first-stage humidification chamber in the multi-stage bubble-column humidifier.

Meanwhile, a cool, dry carrier gas is bubbled through the bath 24 of each stage to remove the vaporized component from the baths 24 (as shown in FIG. 2), where flow of the carrier gas between the chambers is shown with arrows 36 in FIG. 1. The carrier gas can be, e.g., air, and it can initially be fed into the first-stage humidification chamber 16 from a carrier-gas reservoir 35 pressurized by a blower pump 34 feeding into the reservoir 35. The carrier gas fills a lower gas region 38 inside the first-stage humidification chamber 16 and flows through a bubble distributor (here, a sparger plate) 40 into the bath 24 in the form of bubbles 42 (as shown in FIG. 2), where the carrier gas is heated and humidified (with the heat and humidification provided by the feed liquid). The vaporizable component (e.g., water) of the feed liquid vaporizes into the bubbles 42 at the gas-liquid interface of the bath 24 and bubbles 42. The bubbles 42 flow up through the bath 24, gaining thermal energy and the vaporizable component (in vapor form) from the bath 24 until the carrier gas enters the top gas region above the bath 24 and then out the gas conduit to the second-stage humidification chamber 18. The remaining humidification chambers 18, 20 and 22 have a design and operation similar to or the same as that of the first-stage humidification chamber 16; and the bath 24 in each of the humidification chambers 16, 18, 20 and 22 can have a width (w) that is substantially greater than (e.g., at least twice as great as) its height (h) to enhance the efficiency with which the vaporizable component is vaporized and transferred to the carrier gas. The pressure drop on the carrier-gas (bottom) side of the sparger plate 40 is a strong function of the height of the bath 24 because the hydrostatic height of the bath 24 needs to be overcome by the air to keep the bath liquid from "weeping" through the sparger plate 40 to the stage below. A main advantage of the low height of the bath 24 is, hence, the reduced electricity consumption in the air-moving device (blower) 34 because of the lower pressure drop. Maintaining a low height of the bath is also feasible in this context because the characteristic dimension of heat transfer is of the order of a few millimeters.

Figure 3:
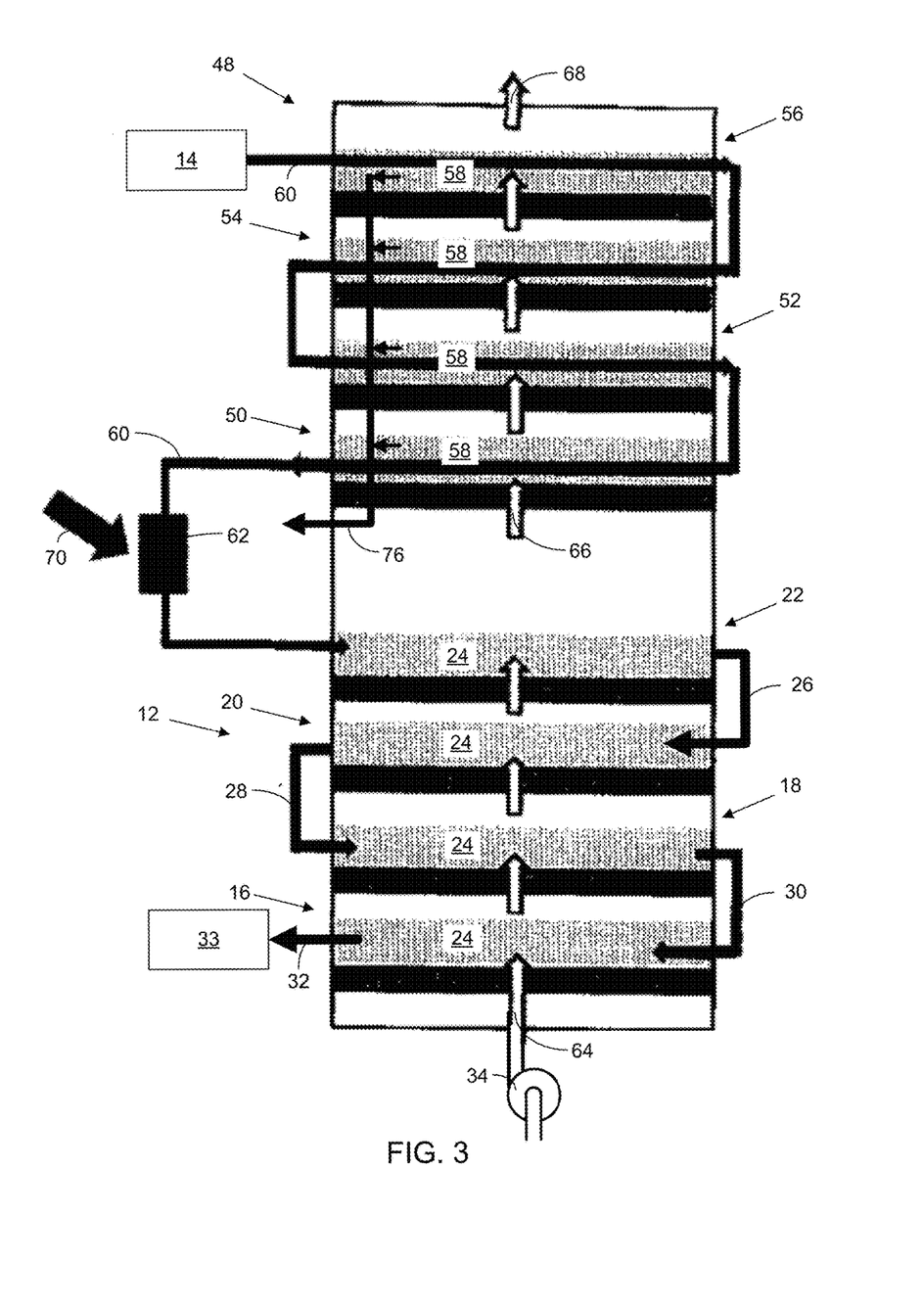
FIG. 3 is a schematic sectional illustration of a multi-stage, single-column humidification-dehumidification (HDH) system.

An embodiment in which a multi-stage bubble-column humidifier 12 and dehumidifier 48 are stacked is illustrated in FIG. 3. In this embodiment, the humidifier 12 includes four stages 16, 18, 20 and 22 and operates as described in the embodiments, above. Here, however, the dehumidified carrier gas 66 from the fourth-stage humidification chamber 22 is pumped from the fourth-stage humidification chamber 22 into the first-stage dehumidification chamber 50 of the dehumidifier 48. The dehumidifier 48 can have the same or essentially the same design as the multi-stage bubble-column dehumidifier of U.S. application Ser. No. 13/241,907. The baths 58 in the dehumidification chambers 50, 52, 54, and 56 can be formed of a liquid having the same composition (e.g., water) as the component vaporized from the feed liquid in the humidifier 12.

Among the dehumidification chambers 50, 52, 54 and 56, the temperature of the bath 58 in the first-stage dehumidification chamber 50 is higher than the temperature of the bath 58 in the second-stage dehumidification chamber 52; the temperature of the bath 58 in the second-stage dehumidification chamber 52 is higher than the temperature of the bath 58 in the third-stage dehumidification chamber 54; and the temperature of the bath 58 in the third-stage dehumidification chamber 54 is higher than the temperature of the bath 58 in the fourth-stage dehumidification chamber 56. Pure condensed liquid (e.g., liquid water) is extracted from the dehumidifier 48 via output conduit 76 into which the condensate flows from each of the dehumidification chambers 50, 52, 54 and 56.

The baths 58 can be heated by thermal energy transferred from the hot humidified carrier gas 66 successively injected into and through each of the baths 58, where the condensable vapor component is condensed from the humidified carrier gas 66 in liquid form into the baths 58 as the carrier gas 66 is successively cooled through the stages. Meanwhile, the feed liquid is pumped from the feed-liquid source 14 through a serpentine conduit 60 that snakes through the bath 58 in each stage; thermal energy is conducted from the baths 58 through the conduit 60 into the feed liquid to gradually pre-heat the feed liquid en route to a heater 62 that injects additional thermal energy 70 into the feed liquid to raise its temperature, e.g., to 70° C. before the feed liquid is injected into the fourth-stage humidification chamber 22 to form the bath 24 therein.

Figure 4:
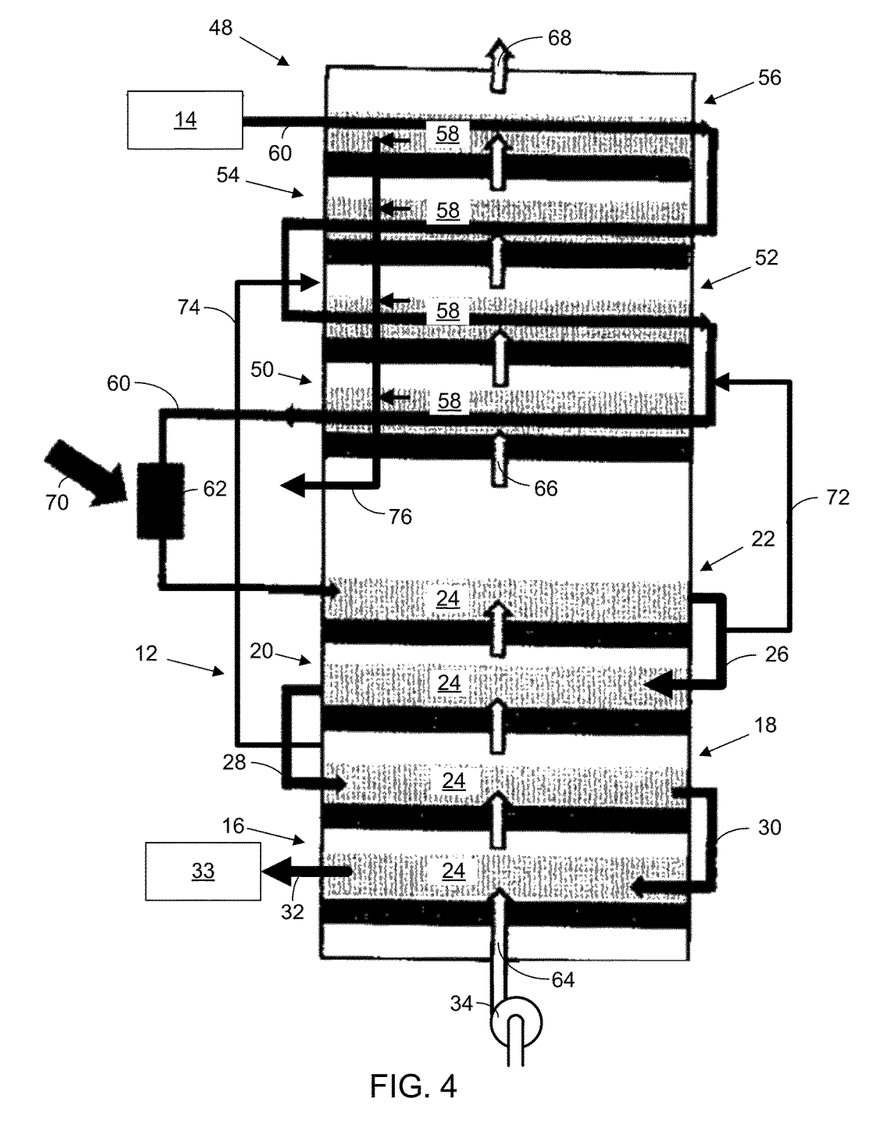
FIG. 4 is a schematic sectional illustration of a multi-stage, single-column HDH system including multi-extraction conduits for the feed liquid and carrier gas.

In the embodiment of FIG. 4, the apparatus also includes multi-extraction conduits 72 and 74 extending between intermediate locations (i.e., locations between the initial and final chambers) in the multi-stage humidifier 12 and dehumidifier 48. Conduit 72 extracts a portion of the feed-liquid remnant from the fourth-to-third-stage conduit 26 (though it can also/alternatively extract from conduit 28 or 30) and recirculates the extracted feed-liquid remnant (at a warmer temperature) back to the feed-liquid conduit 60 between stages (here, between the first- and second-stage dehumidification chambers 50 and 52) of the multi-stage dehumidifier 48. With multi-extraction, the extraction/injection of the feed liquid from in-between the stages of the bubble column(s) via conduits 72 facilitates thermodynamic balancing of the system in operation. Similarly, a portion of the carrier gas can be extracted from at least one intermediate location in the humidifier 12 (here, from second-stage humidification chamber 28) via conduit 74 and injected into a stage (here, into the second-stage dehumidification chamber 52) of the multi-stage dehumidifier 12.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for humidification of a vaporizable component from a feed liquid into a carrier gas, the method comprising:

flowing the feed liquid including the vaporizable component into a second-stage humidifier chamber of a multi-stage humidifier to form a second-stage humidifier bath at a second humidification temperature;

flowing a first remnant of the feed liquid from the second-stage humidifier chamber into a first-stage humidifier chamber of the multi-stage humidifier to form a first-stage humidifier bath at a first humidification temperature, wherein the first humidification temperature is lower than the second humidification temperature;

removing a second remnant of the feed liquid from the first-stage humidifier chamber;

injecting the carrier gas into the first-stage humidifier bath in the first-stage chamber and bubbling the carrier gas through the feed liquid in the first-stage humidifier bath, where the carrier gas collects the vaporizable component in vapor form from the first remnant of the feed liquid to partially humidify the carrier gas with the vaporizable component;

directing the partially humidified carrier gas from the first-stage humidifier chamber into the second-stage humidifier bath in the second-stage humidifier chamber and bubbling the carrier gas through the second-stage humidifier bath, where the carrier gas collects more of the vaporizable component in vapor form from the feed liquid to further humidify the carrier gas with the vaporizable component;

removing the humidified carrier gas from the second-stage humidifier chamber;

condensing the vaporizable component from the humidified carrier gas in a dehumidifier after the humidified carrier gas is removed from the second-stage humidifier chamber, wherein the vaporizable component is condensed in the dehumidifier from the humidified carrier gas by bubbling the humidified carrier gas through a first-stage dehumidifier bath in a first-stage dehumidifier chamber at a first dehumidification temperature, wherein the first dehumidification temperature is lower than the second humidification temperature;

flowing the feed liquid through a feed-liquid conduit passing through a second-stage dehumidifier bath and then through the first-stage dehumidifier bath before the feed liquid flows into the second-stage humidifier chamber, wherein the feed liquid is heated by thermal energy extracted from the second- and first-stage dehumidifier bath as the feed liquid flows through the feed-liquid conduit passing through the dehumidifier baths; and extracting a portion of a remnant of the feed liquid from at least one intermediate location in the multi-stage humidifier and feeding the portion of the remnant of the feed liquid from each extracted intermediate location to a corresponding intermediate location in the dehumidifier, allowing for manipulation of feed liquid flows and for greater heat recovery.

2. The method of claim 1, wherein the feed liquid that flows into the second-stage humidifier chamber is a remnant of a liquid from a third-stage humidifier bath at a third humidification temperature in a third-stage humidifier chamber, wherein the third humidification temperature is higher than the second humidification temperature, the method further comprising directing the humidified carrier gas from the second-stage humidifier chamber into the third-stage humidifier bath in the third-stage humidifier chamber and bubbling the humidified carrier gas through the third-stage humidifier bath before the humidification carrier gas is directed into the dehumidifier, where the humidified carrier gas is further humidified with more of the vaporizable component in vapor form from the third-stage bath.

3. The method of claim 1, wherein the vaporizable component is water.

4. The method of claim 3, wherein the feed liquid is sea water or brackish water.

5. The method of claim 3, wherein the feed liquid is flowback water or produced water from oil or gas extraction.

6. The method of claim 1, wherein the carrier gas, when exiting the second-stage humidifier bath, has a temperature 3-8° C. higher than the temperature of the carrier gas exiting the first-stage humidifier bath.

7. The method of claim 1, wherein the humidifier baths have a width, measured perpendicular to the flow of the carrier gas through the bath, and a height, measured parallel to the flow of the carrier gas, wherein the width is at least twice as great as the height.

8. The method of claim 1, further comprising using an additional heat source to further heat the feed liquid after the feed liquid flows through the conduit passing through the dehumidifier chambers and before the feed liquid flows through the humidifier chambers.

9. The method of claim 1, wherein the dehumidifier baths have substantially the same composition, in liquid form, as the vaporizable component from the liquid feed.

10. The method of claim 1, wherein the dehumidifier is a multi-stage dehumidifier including a plurality of dehumidification chambers.

11. The method of claim 1, wherein a portion of the carrier gas is extracted from at least one intermediate location in the multi-stage humidifier and fed from each extracted intermediate location to a corresponding intermediate location in the dehumidifier, allowing for manipulation of gas mass flows and for greater heat recovery.

12. The method of claim 1, wherein the multi-stage humidifier is an integral structure, with the stages separated only by a sparger plate, and wherein the partially humidified carrier gas is directed directly from the first humidifier chamber through the sparger plate into the second-stage humidifier bath without exiting the integral structure, and wherein the first-stage humidifier bath is separated from the second-stage humidifier bath by a top gas region in the first-stage humidifier chamber filled with the partially humidified carrier gas from the bubbling in the first-stage humidifier bath before the partially humidified carrier gas passes through the sparger plate.

\* \* \* \* \*